(12) United States Patent
Barrette et al.

(10) Patent No.: US 7,395,891 B2
(45) Date of Patent: Jul. 8, 2008

(54) ENGINE TORQUE TRUNCATION METHOD FOR A FOUR-WHEEL DRIVE VEHICLE

(75) Inventors: Peter Barrette, Ann Arbor, MI (US); John Glab, Riverview, MI (US); Joseph Torres, Dearborn, MI (US); John O'Rear, Whitmore Lake, MI (US); Brian Hildreth, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 11/161,803

(22) Filed: Aug. 17, 2005

(65) Prior Publication Data

US 2007/0039770 A1    Feb. 22, 2007

(51) Int. Cl.
    *B60K 28/16* (2006.01)
(52) U.S. Cl. .................. 180/197; 180/247; 477/181
(58) Field of Classification Search ........... 180/197, 180/247; 477/181, 176
    See application file for complete search history.

(56) References Cited

U.S. PATENT DOCUMENTS

| | | | | |
|---|---|---|---|---|
| 4,936,405 A * | 6/1990 | Hrovat | ............... | 180/197 |
| 4,989,686 A * | 2/1991 | Miller et al. | ............... | 180/197 |
| 5,002,147 A * | 3/1991 | Tezuka et al. | ............... | 180/197 |
| 5,004,064 A * | 4/1991 | Tezuka et al. | ............... | 180/197 |
| 5,303,794 A * | 4/1994 | Hrovat et al. | ............... | 180/197 |
| 5,383,824 A | 1/1995 | Runge et al. | | |
| 5,979,584 A | 11/1999 | Glab et al. | | |
| 5,993,354 A | 11/1999 | Winks | | |
| 6,033,341 A * | 3/2000 | Yamamoto et al. | .......... | 477/181 |
| 6,213,242 B1 | 4/2001 | Rodrigues et al. | | |
| 6,498,974 B1 | 12/2002 | Rodrigues et al. | | |
| 6,498,975 B1 | 12/2002 | Lee et al. | | |
| 6,511,397 B2 | 1/2003 | Glab et al. | | |
| 6,512,972 B1 | 1/2003 | Glab et al. | | |
| 6,568,256 B1 | 5/2003 | Lee | | |
| 6,662,918 B2 * | 12/2003 | Takeuchi et al. | ............ | 192/3.29 |
| 2006/0148616 A1 * | 7/2006 | Ray et al. | .................... | 477/175 |

* cited by examiner

*Primary Examiner*—Kevin Hurley
(74) *Attorney, Agent, or Firm*—David B. Kelley; Brooks Kushman P.C.

(57) ABSTRACT

A four wheel drive powertrain control for an automotive vehicle is disclosed. It includes a torque transfer case that distributes power from an engine-powered transfer case mainshaft to a secondary driving axle through a friction clutch as power is distributed directly from the engine-powered mainshaft to a primary driving axle. The friction clutch capacity is sufficient to mechanically lock the transfer case in a four wheel drive mode. If the clutch torque capacity is exceeded, a control algorithm will strategically ramp down engine torque requests by a powertrain controller to eliminate clutch slip.

10 Claims, 8 Drawing Sheets

ENGINE TORQUE TRUNCATION METHOD FOR A FOUR-WHEEL DRIVE VEHICLE

BACKGROUND OF THE INVENTION

1. Field of the Invention

The invention relates to a method for truncating engine torque in a four-wheel drive vehicle powertrain to regulate maximum vehicle wheel traction.

2. Background Art

In a typical automatic four-wheel drive vehicle powertrain, engine torque is transmitted to vehicle traction wheels through a transmission and through a torque transfer case situated at the torque output side of the transmission. Such vehicles have two driving axles, one at the rear of the vehicle and one at the front. The transfer case divides driving torque proportionally between the front axle and the rear axle in accordance with a control algorithm residing in a four-wheel drive vehicle system control module.

During one operating mode, the control module will condition the powertrain for torque transfer from the torque transfer case to the rear axle through a rear wheel driveshaft, thus establishing normal rear-wheel drive operation. In another operating mode, the driving torque is divided into a first torque component distributed through a front wheel driveshaft to the front axle and a second torque component distributed through the rear wheel driveshaft to the rear axle.

The control module, which receives input data from speed sensors that measure the speed of each axle, as well as other input variables, uses those measurements as input data to execute the control algorithm to determine how much torque should be distributed to each axle. The controller will cause a transfer of additional torque to one axle and reduce torque at the other axle depending upon the traction wheel torque loads.

It is known design practice to effect a four-wheel driving mode by locking the rear traction wheels to the front traction wheels using a positive drive locking clutch in the torque transfer case. Typically, when the positive drive locking clutch is engaged, provision is made for changing the driving speed ratio between a direct drive speed ratio and an underdrive speed ratio.

It is known design practice also to eliminate the positive drive locking clutch and to establish instead a positive driving connection between the driving axles using a friction clutch with torque input friction elements connected driveably to one driving axle and companion torque output friction elements connected driveably to the other driving axle. The friction clutch, under normal operating conditions, can be commanded to achieve its maximum torque transmitting capacity to effect a locked driving connection of one axle to the other. If the transfer case is not sized to reach a traction wheel skid torque, however, it is possible under some rare operating conditions for the clutch to slip and to damage the clutch friction elements. This could occur, for example, if the vehicle is operating on an off-road terrain or during certain winter driving events when the output speed of the rear axle will exceed the output speed of the front axle, thus creating a clutch slip condition that can cause clutch failure if the slip condition continues, even for a short time. Operation of the vehicle under this condition causes the rear traction wheels to spin when the front traction wheels do not spin. This typically would occur, furthermore, when the engine throttle is at an advanced setting.

If the clutch were to be designed with sufficient capacity to effect a positive lock between the driveshafts for the front traction wheels and the rear traction wheels under all four-wheel driving conditions, the required geometry of the clutch, of necessity, would make it difficult, if not impossible, to meet the packaging constraints of a contemporary four-wheel drive vehicle powertrain. Further, each of the components that distribute torque from the engine through the transfer case to the front axle would be required to accommodate the peak torque associated with a locked up friction clutch. This would require a design upgrade for the torque transmitting components of the transfer case that would be in excess of the design requirements for normal operating conditions of the vehicle even though skid torque of the front traction wheels is rarely experienced.

SUMMARY OF AN EMBODIMENT OF THE INVENTION

The present invention comprises an engine torque truncation strategy for a transfer case in a four-wheel drive vehicle powertrain. The powertrain may have four driving modes; i.e., a two-wheel drive mode, an automatic four-wheel drive mode, a four-wheel drive high ratio driving mode and a four-wheel drive low ratio driving mode. In the case of the four-wheel drive high driving mode and the four-wheel drive low driving mode, a friction clutch is used to lock the transfer case clutch to establish either a direct driving ratio (high ratio)or a low speed driving ratio (low ratio) between the transfer case input and the driveshafts for the front and rear traction wheels. The low speed driving ratio, in a typical embodiment of the invention, may be 2.73:1. The friction clutch is activated by an electromagnetic actuator. The capacity of the friction clutch may be about 70% of the torque required to skid the front wheels. In a typical embodiment, this torque may be about 900 lbs-ft.

The transfer case clutch of the present invention can meet the requirements of a large percentage of actual driving events. The transfer case is sized strategically to allow the use of smaller, lighter and less costly front wheel driveline components while meeting the large majority of driving needs below the transfer case torque capacity.

The invention uses an algorithm to detect when a potentially damaging clutch slip condition is present during operation in the 4×4 high operating mode and in the 4×4 low operating mode as well as during operation in the automatic four-wheel drive mode. A control algorithm predicts when the transfer case clutch may be damaged by excessive slipping. If a potentially damaging clutch slip condition is present, the engine control system commands a reduce engine torque until the potentially damaging transfer case clutch slip condition disappears. If the torque reduction does not resolve the slip condition, then the algorithm will disable the friction clutch completely so that the vehicle will operate only in a two-wheel drive mode (front wheel drive or rear wheel drive).

If a potential slip condition is determined by the control algorithm, the engine will be commanded to reduce torque by a calibrated first increment. The control strategy then will determine whether the slip condition of the clutch is reduced by reason of the incremental engine torque reduction. If the incremental torque reduction does not have its desired effect on slip, a further incremental torque reduction will occur after a calibrated delay and a further calculation of clutch slip is computed. This procedure is repeated until the clutch slip is eliminated.

The torque truncation is discontinued if the slip condition is eliminated for a predetermined time interval, and then torque is restored in incremental steps.

If a slipping condition is detected before the torque request (i.e., the commanded engine torque) is ramped up to its maximum value, the ramping up is interrupted as a second slip event control routine is initiated.

A controller receives input variables including an output shaft speed sensor signal for the rear wheel driveshaft and an output shaft speed sensor signal for the front wheel driveshaft, as well as a commanded duty cycle for the clutch actuator.

In an embodiment of the invention, the electromagnetic clutch actuator establishes a clutch engaging force on its torque input friction disks and its torque output friction disks for the torque transfer case clutch.

Although the embodiment of the invention disclosed is used in a vehicle in which the primary driving axle is the rear axle and the secondary driving axle is the front axle, the invention can be used as well in a vehicle in which the front driving axle is the primary driving axle and the rear driving axle is the secondary driving axle. In each case, torque is delivered through the transfer case clutch to the secondary axle as torque is delivered directly from a transfer case mainshaft to the primary driving axle.

BRIEF DESCRIPTION OF THE DRAWINGS

FIG. 5b is a time plot of the differential speeds for the driveshaft for the front traction wheels and the driveshaft for the rear traction wheels, which correspond to the torque request plot of FIG. 5a;

FIG. 5d is a time plot indicating the clutch duty cycle during the two slip events illustrated in FIG. 5a;

FIG. 6b is a plot of the speed differential (delta speed) for the driveshaft for the front traction wheels and the driveshaft for the rear traction wheels corresponding to the torque request illustrated in FIG. 6a;

PARTICULAR DESCRIPTION OF AN EMBODIMENT OF THE INVENTION

Figure 1:
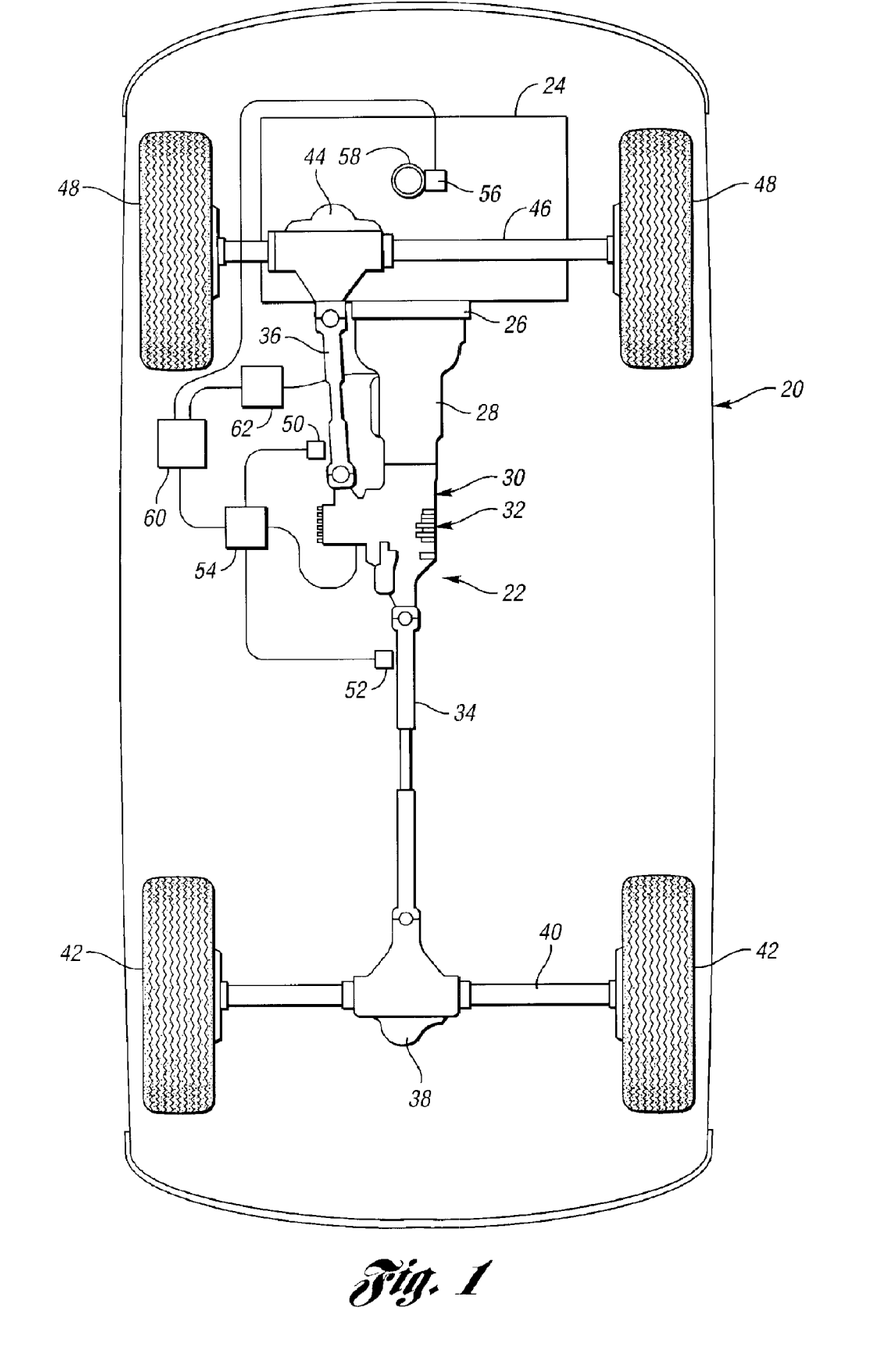
FIG. 1 is a schematic illustration of a four-wheel 4×4 drive vehicle powertrain capable of embodying the present invention.

FIG. 1 illustrates a vehicle 20, having a vehicle driveline 22. The vehicle driveline 22 comprises a powertrain including an engine 24 engaged with a torque converter 26, which, in turn is engaged with the input of an automatic transmission 28. As an alternative, the torque converter and the automatic transmission can be replace with a clutch and a manual transmission, but this will not be described here further because these components are conventional and well known in the art.

The automatic transmission 28 is engaged with the input of a torque transfer case 30, which includes an electromagnetic clutch 32. It is connected to a rear axle (primary) driveshaft 34 and a front axle (secondary) driveshaft 36. The rear driveshaft 34 is coupled to a rear differential 38, which is connected to a rear (primary) axle 40. Axle 40, in turn, is connected to a pair of rear traction wheels and tires 42. The front driveshaft 36 is coupled to a front differential 44, which is connected to a front (secondary) axle 46. Axle 46, in turn, is connected to a pair of front traction wheels and tires 48.

A front driveshaft speed sensor 50 is located to sense the rotational speed of the front driveshaft 36. A rear driveshaft speed sensor 52 is located to sense the rotational speed of the rear driveshaft 34. The outputs of the front speed sensor 50 and the rear speed sensor 52 are input to a 4×4 powertrain control module 54. Alternatively, a pair of front speed sensors (not shown), each one being associated with a different one of the front wheels 48, can measure the speed of each of the front wheels 48, in which case an average of the two wheel speeds is used instead of the speed of the secondary driveshaft 36. Also, alternatively, a pair of rear speed sensors (not shown), each one being associated with a different one of the rear wheels 42, can measure the speed of each of the rear wheels 42, in which case an average of the two wheel speeds is used instead of the speed of the primary driveshaft 34. In any event, the speed of the front driveshaft 36 and the rear driveshaft 34 can be determined.

The 4×4 control module 54 controls the electromagnetic clutch 32. The transfer case electromagnetic clutch 32 distributes a variable percentage of torque to the front driveshaft 36. If the clutch 32 has a zero percent duty cycle, then all of the torque is transferred to the rear (primary) driveshaft 34. If the clutch 32 has a one hundred percent duty cycle, then one half of the torque is transferred to the rear driveshaft 34 and the other half is transferred to the front driveshaft 36. The clutch duty cycle between zero and one hundred percent is generally linear.

A throttle position sensor 56, which is mounted on a throttle body 58 on the engine 24, measures the angle of throttle opening and sends a throttle position output (TPO) signal to a powertrain control module (PCM) 60. The PCM 60 may apply error corrections to the TPO signal before sending the TPO signal to the 4×4 control module 54. The TPO is measured from zero percent, which is the throttle closed position, to one hundred percent, which is full open throttle position. The PCM 60 is also in communication with a transmission control module 62, which controls the operation of the automatic transmission 28.

Figure 2:
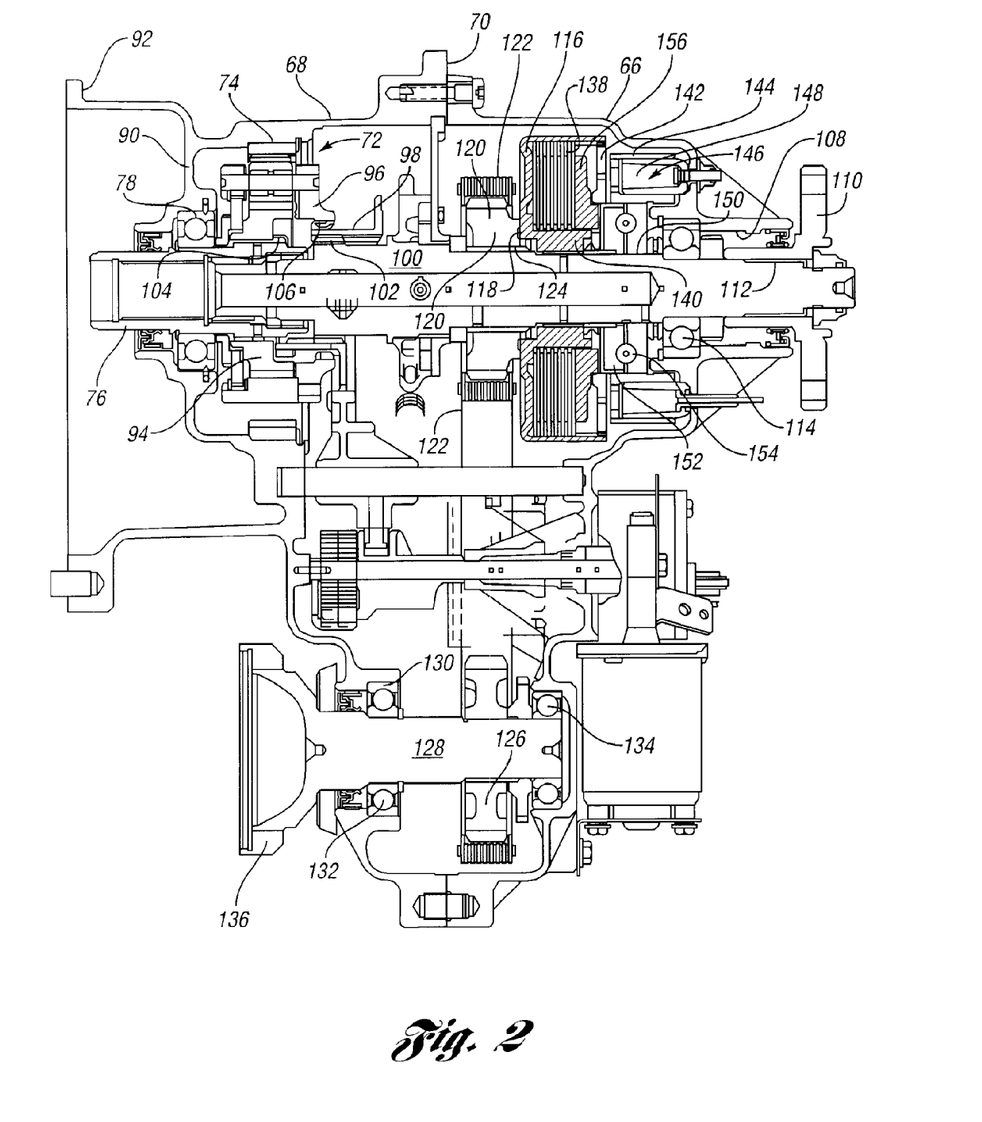
FIG. 2 is a cross-sectional assembly view of a transfer case for use in the powertrain of FIG. 1.

The torque transfer case 30 is shown in particular detail in FIG. 2. It includes a transfer case housing portion 66 and a companion transfer case housing portion 68. The housing portions are bolted together at their respective peripheries, as shown at 70. Housing portion 68 encloses a planetary gear unit 72, which comprises a ring gear 74 fixed to the housing portion 68. A torque input shaft 76 is driveably connected to the torque output shaft of transmission 28, shown in FIG. 1.

Shaft 76 is journalled by bearing 78 in a bearing opening formed in bearing wall 90. The housing portion 68 can be bolted to the transmission housing at the periphery of the housing portion 68, as shown at 92.

Shaft 76 is driveably connected, preferably by a splined connection, to sun gear 94 of planetary gear unit 72. A planetary carrier 96 supports planetary pinions that driveably engage sun gear 94 and ring gear 74. The carrier 96 is connected to a sliding dog clutch sleeve 98, which surrounds transfer case mainshaft or torque output shaft 100. Clutch sleeve 98 is formed with internal clutch teeth, which are driveably engaged with external clutch teeth 102 on shaft 100. The right-hand end of torque input shaft 76 has external clutch teeth 104, which engage the internal clutch teeth of the sleeve 98 when the sleeve 98 is shifted in a left-hand direction, thereby establishing a direct driving connection between shaft 76 and shaft 100. When sleeve 98 is shifted in a right-hand direction, external clutch teeth on sleeve 98 driveably engage internal teeth 106 on the carrier 96, thereby establishing a driving connection between the carrier and the shaft 100.

When the sleeve 98 is shifted in a left-hand direction, the speed ratio between shaft 76 and shaft 100 is 1:1. When the sleeve 98 is shifted in a right-hand direction, the speed ratio between shaft 76 and shaft 100 is an underdrive ratio 2.73:1 in the particular embodiment illustrated in FIG. 2. That ratio can be varied if desired, however, by using gear elements of a different geometry.

Shaft 100 extends outwardly through a shaft opening in housing portion 66, as shown at 108. A drive flange 110 with an internally splined hub is connected driveably to an externally splined end of shaft 100, as shown at 112. The flange 110 facilitates a driving connection with driveshaft 34, shown in FIG. 1. Shaft 100 is supported in the opening 108 by end bearing 114.

A clutch housing 116 is connected driveably at 118 to a sprocket gear 120 for drive chain 122. The shaft 100 is splined or otherwise driveably connected to the hub of sprocket gear 120, as shown at 124.

A driven sprocket gear 126 is driveably connected to torque output shaft 128, which extends through a bearing opening in housing portion 68, as shown at 130. A shaft support bearing 132 in bearing opening 130 and an end bearing 134 in a bearing opening in housing portion 66 rotatably journal the torque output shaft 128, which carries a torque output flange 136. Driveshaft 36, seen in FIG. 1, is driveably connected to the flange 136.

Clutch housing 116 carries externally splined clutch friction disks 138, which are arranged in inter-digital relationship with respect to internally splined disks carried by clutch element 140, which in turn is splined or otherwise driveably connected to the shaft 100.

A clutch plate 142 is situated within the clutch housing 138 and slidably splined or keyed to it. It is positioned directly adjacent an armature 144 for an electromagnetic actuator 146. The actuator 146 includes stationary solenoid electrical windings 148, which are supported by the housing portion 66. The armature 144 is directly connected to shaft 100, as shown at 150. A ball ramp ring 152 surrounds the shaft 100 and is slidably splined to shaft 100. It is free to move axially when the armature is displaced angularly with respect to the ramp ring 152. The ramp ring is spring biased in a right-hand direction toward the armature 144.

Thrust balls 154 are located in ramped pockets in the ramp thrust ring 152 and in the adjacent armature 144.

A clutch pressure plate 156 is located directly adjacent the armature 144 and is electromagnetically coupled with the pole face of the armature 144 when the windings 148 are energized. This creates a torque on the armature when a magnetic field for the windings is generated. The force of the magnetic field causes the armature to slow down relative to the speed of the shaft 100, which creates a thrust force on the thrust ring 152. That thrust force is applied to the thrust plate 156, thereby engaging the friction disks of the clutch. This allows torque transfer from shaft 100 to shaft 128 through the drive chain 122. The torque generated by the clutch plate, when the pressure plate is forced into the clutch engaging position by the ball ramp 152, complements the friction torque established by the clutch plate 142 as the clutch plate is drawn toward armature 144.

Figure 3A:
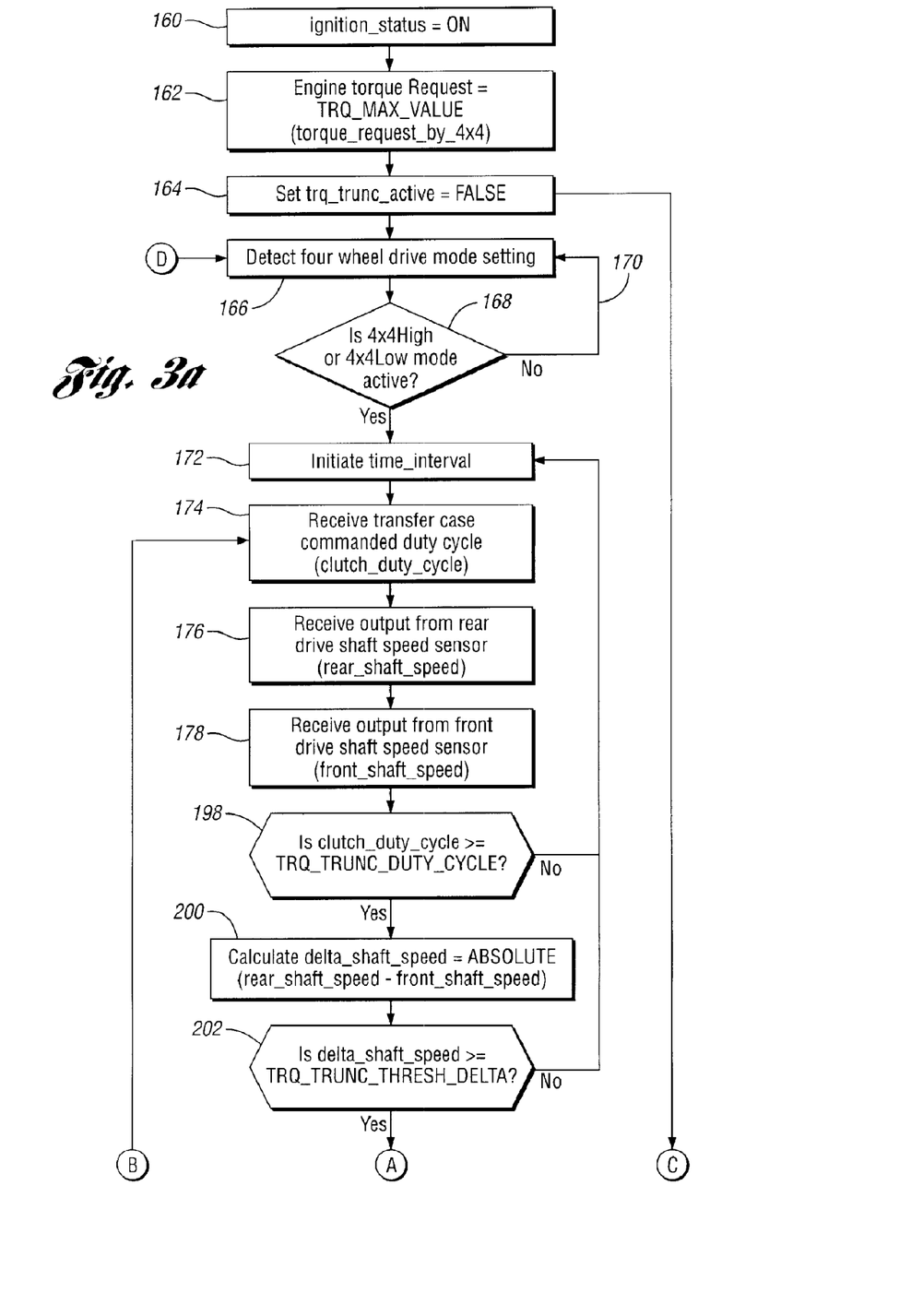
FIGS. 3a, 3b and 3c is a composite flowchart indicating the method steps involved in the control of the friction clutch for the torque transfer case of FIG. 2 in accordance with the control algorithm for the invention.
Figure 3B:
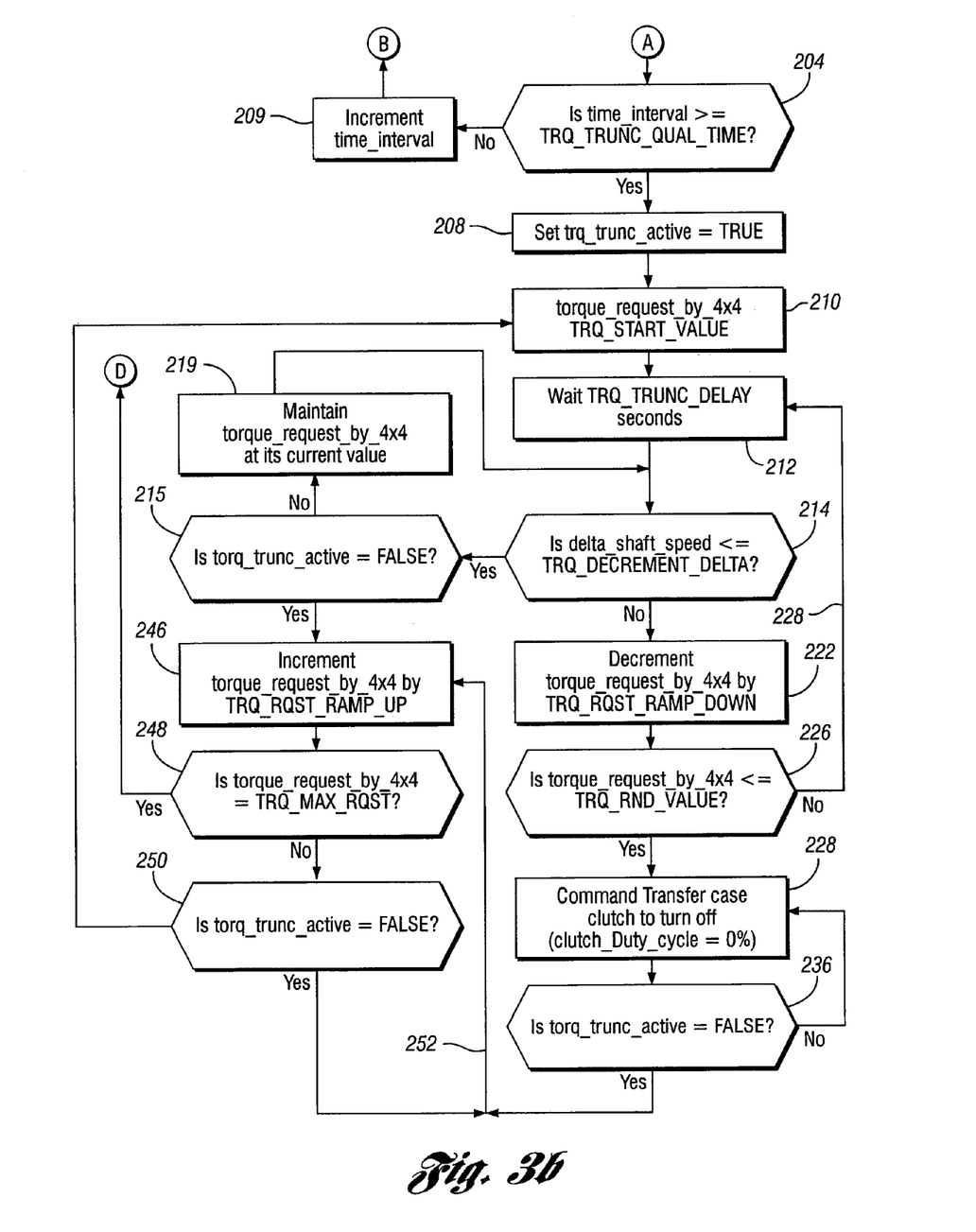
Figure 3C:
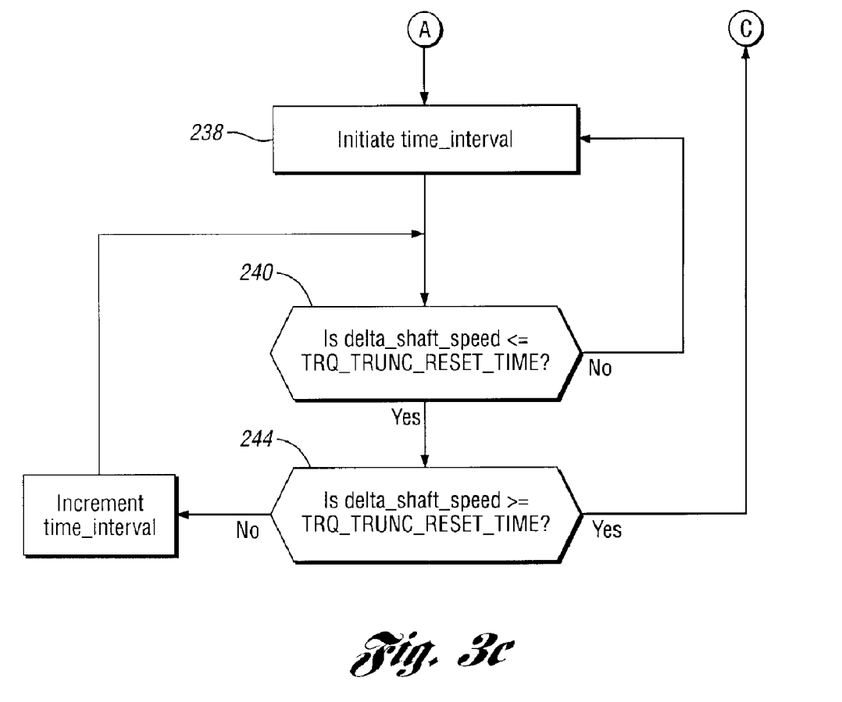

The algorithm that is relied upon for executing the method steps for the control of the friction clutch of FIG. 2 is illustrated in FIGS. 3a, 3b and 3c.

At the beginning of the control routine, it is determined at action block 160 whether the engine is operating. If the ignition switch is ON, which would indicate that the engine is operating, and an engine torque request is made at action block 162, the maximum value for the torque request is set by the controller to a precalculated artificially high value. This is done because the controller will arbitrate several torque requests from other systems in the powertrain, each of which has its own torque requirements. By artificially setting the torque request for the clutch at 162 at a high value, the torque requirements for the other powertrain systems will not be compromised, at this stage in the control routine, by initiation of an engine torque truncation for the 4×4 drive mode. The torque truncation can occur using engine throttle adjustment, or fuel control, or spark timing retard.

In the next action block 164, the controller will address a register for a flag indicating that an engine truncation request is not being demanded at this stage of the routine.

The next step in an initialization process involves a determination at action block 166 regarding whether a four-wheel drive mode setting is in effect. That four-wheel drive setting can be either a low ratio or a direct drive high ratio, as explained previously.

The control routine then proceeds to decision block 168 where it is determined whether a four-wheel drive 4×4 mode, either a low ratio mode or a high ratio mode, is active. If a 4×4 mode is not active, the routine will proceed no further, as indicated at 170.

If a 4×4 mode is active and if a clutch slipping condition is detected at action block 172, a measurement is made at 172 of how long the slipping has occurred. If the slipping time exceeds a calibrated interval, the routine will proceed to action blocks 174, 176 and 178 where input data for the processor is received. The input data includes a clutch actuator commanded duty cycle at 174, an output shaft rear driveshaft speed sensor signal at 176, and an output speed signal from the front driveshaft speed sensor. The rear output shaft speed sensor is shown at 52 in FIG. 1 and the front output shaft speed sensor is shown at 50 in FIG. 1, as previously indicated. The commanded duty cycle is graphically illustrated in the time plot of FIG. 4c, as shown at 180.

Figure 4A:
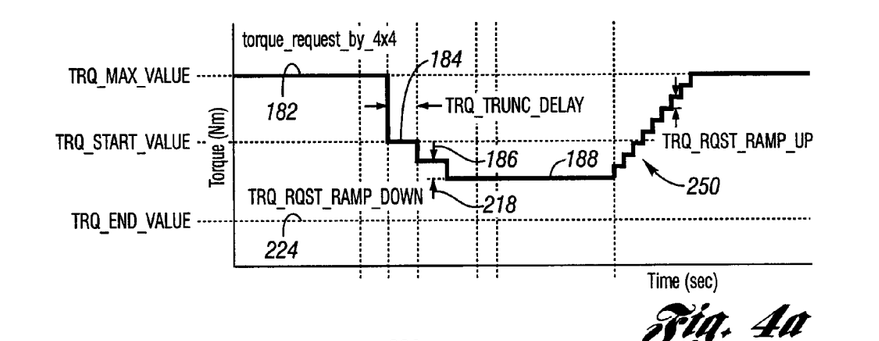
FIG. 4a is a time plot showing the variations in the engine torque request during a slip control routine for the clutch shown in FIG. 2.
Figure 4B:
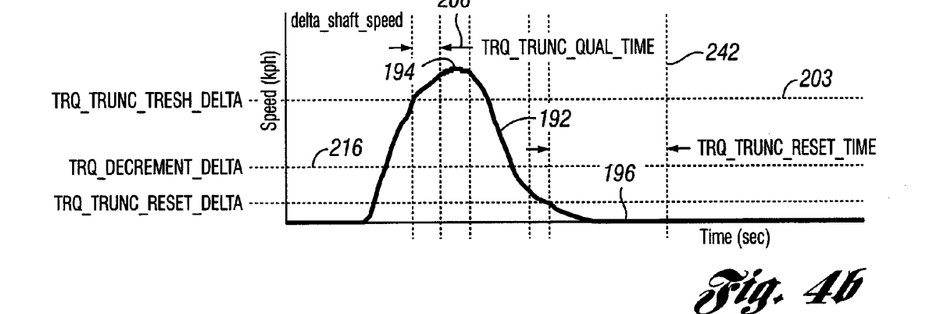
FIG. 4b is a time plot for the speed difference for the front wheel driveshaft and the rear wheel driveshaft.
Figure 4C:
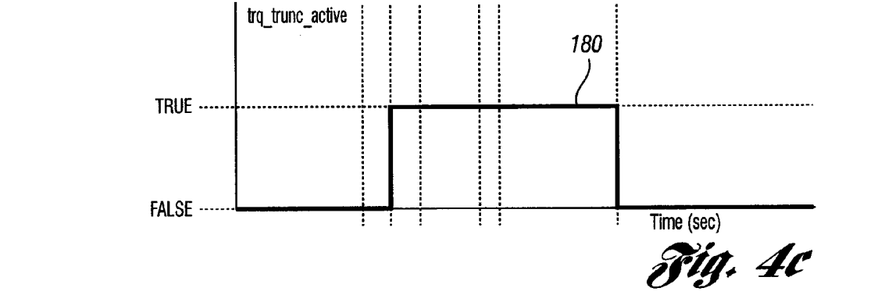
FIG. 4c is a time plot indicating an instance in which torque truncation occurs.

FIG. 4a shows the maximum torque request value at 182. The duty cycle at 180 in FIG. 4c is commanded when a slip condition (i.e., a delta shaft speed) is detected and the delta shaft speed continues for a calibrated time TRQ_TRUNC_QUAL_TIME, as seen in FIG. 4b. The torque request is decreased as shown at 184. If the slip continues for the calibrated time, the torque request again is decreased to a still lower value, as shown at 186 in FIG. 4a. The delta speed corresponding to the torque request levels at 182, 184 and 186 is plotted in FIG. 4b.

The torque reductions, which occur in steps as previously explained, continue until the delta speed at a given time for a given control loop of the microprocessor is less than the delta speed during the preceding control loop. This is the condition indicated at 188 in FIG. 4*a*.

The truncation of the engine torque continues, as shown in FIG. 4*c*, when the torque request is at the level 188 and the delta speed continues to drop, as shown in FIG. 4*b*.

During the events that are illustrated in FIGS. 4*a*, 4*b* and 4*c*, the clutch duty cycle is held at its calibrated value, as shown at 190. The delta speed, which is plotted at 192 in FIG. 4*b*, decreases from its peak at 194, corresponding to a maximum torque request, to the locked-up condition indicated at 196 as the torque request level 188 is achieved.

Figure 4D:
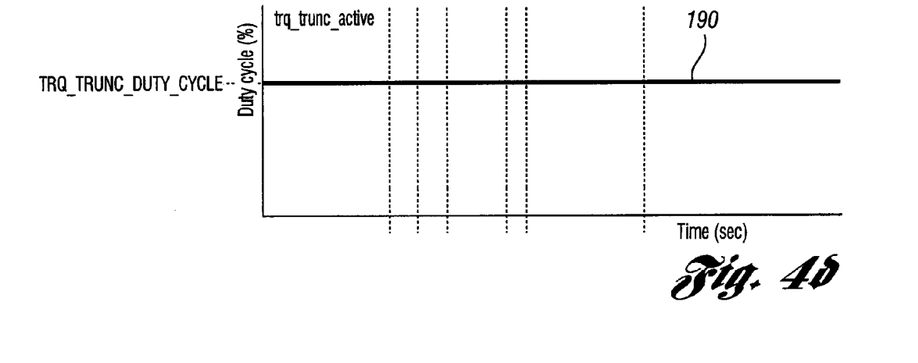
FIG. 4d is a time plot indicating the duty cycle for the actuator for the friction clutch shown in FIG. 2.

In the strategy flowchart of FIGS. 3*a*, 3*b* and 3*c*, it is determined at decision block 198 whether the clutch duty cycle, shown at 190 of FIG. 4*d*, is at its calibrated level (TRQ_TRUNC_ACTIVE). If it is not, the routine will not continue. If it is at its appropriate level, the routine will proceed to action block 200, where the delta speed is calculated using the speed data from action blocks 174, 176 and 178.

It is determined at decision block 202 whether the slip that is calibrated is above the threshold shown at 203 in FIG. 4*b* (TRQ_TRUNC_TRESH_DELTA). It then is determined at decision block 204 in FIG. 3*b* whether a delta speed in excess of the threshold continues for a calibrated time, as shown at 206 in FIG. 4*b* (TRQ_TRUNC_QUAL_TIME). If the excess slip continues for a time greater than the time interval 206, the routine will proceed to action block 208. If the time interval is not exceeded, the time interval is incremented, as shown at 209, and the routine will return to action block 174.

If the routine is allowed to proceed, the requested engine torque is dropped at action block 210, as previously described with reference to FIG. 4*a*. After each decrement of the requested engine torque, the routine will be delayed, at action block 212, for a calibrated interval (TRQ_TRUNC_DELAY) so that the controller will have time to respond to the reduced torque request. After the delay at action block 212 expires, the routine will proceed to decision block 214, where it is determined whether the delta speed is less than or equal to the delta speed indicated at 216 in FIG. 4*b* (TRQ_DECREMENT_DELTA). If it is not less, that indicates the slip condition has not improved. Thus the torque request again is ramped down (TRQ_RQST_RAMP_DOWN), as shown at 218 of FIG. 4*a*. This step is indicated in the flowchart of FIG. 3*b* at 222.

The ramping down can continue until a so-called minimum torque request is reached, as shown at 224 (TRQ_END_VALUE). The determination of whether the minimum torque request has been reached is made at decision block 226 in FIG. 3*b*. If the minimum value has not been reached, the routine may continue, as shown at 228 in FIG. 3*b*. If the minimum torque has been reached, the engine torque cannot be reduced further, lest the engine will stall. If that is the case, the torque transfer case clutch is commanded to turn off, as shown at action block 228. This is the condition indicated in the plots shown in FIGS. 6*a*, 6*b*, 6*c* and 6*d*.

Figure 6A:
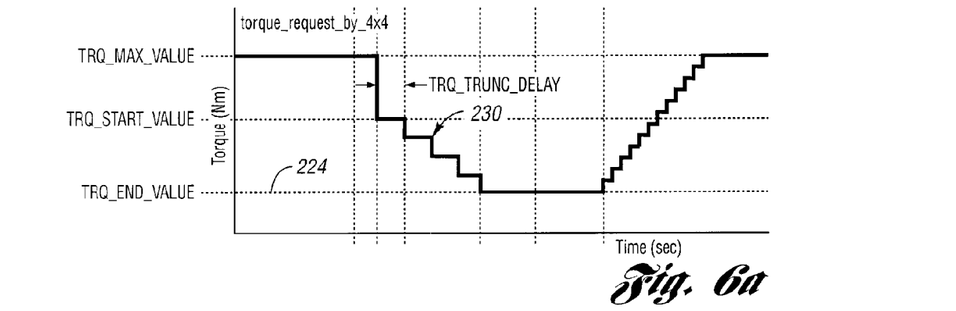
FIG. 6a is a time plot illustrating the torque request that occurs when successive torque reductions take place until the minimum torque value is reached.
Figure 6B:
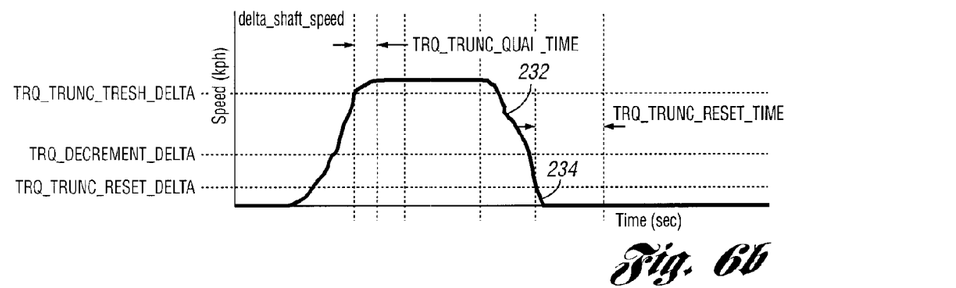

FIG. 6*a* indicates that the torque request has been reduced in successive steps, as shown at 230 in FIG. 6*a*, until the end value 224 is reached. The delta slip value, which is plotted at 232 in FIG. 6*b*, continues, as shown at 234, even though the torque request has been stepped down to a value lower than the end value 224. The transfer case clutch therefore is kept off, as shown by decision block 236 in FIG. 3*b*.

The decision at decision block 236 is a result of a background control loop indicated in FIG. 3*c*. During the progression of the routine, shown in FIG. 3*b*, the background routine of FIG. 3*c* is continuously executed. It is determined at action block 238 in FIG. 3*c* whether the detected slip has gone away for a predetermined time interval. The time interval is set and then it is determined at decision block 240 whether the delta shaft speed has reached the torque truncation reset time shown in FIG. 4*b* at 242. If the delta shaft speed has not reached the time value 242, the routine of FIG. 3*c* will not continue. If the time interval set at 238 is greater than or equal to the reset time 242, as determined at decision block 244 in FIG. 3*c*, the routine will proceed to action block 246 in FIG. 3*b*. Thus, if the slip is zero or close to zero for a given length of time, it is appropriate for the torque request to be ramped-up again in successive steps, as indicated in FIG. 4*a* at 250. The ramping can continue, as shown in FIG. 4*a*, until the maximum torque request is reached (TRQ_MAX_VALUE). This decision is made at decision block 248 in FIG. 3*b*. If slippage still does not occur after the maximum torque request value is reached, as determined at action block 250, the routine will not continue and the method steps beginning at action block 246 will be repeated, as shown at 252 in FIG. 3*b*. If clutch slippage is detected as the torque is ramped up in steps, as shown at 250, the condition shown in FIGS. 5*a*, 5*b*, 5*c* and 5*d* will be observed.

Figure 5A:
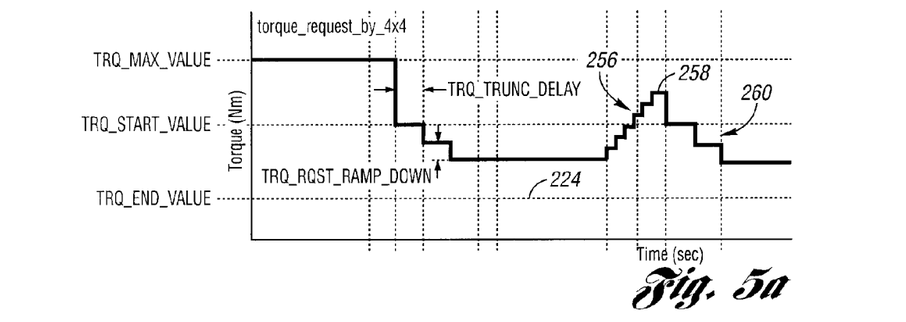
FIG. 5a is a time plot showing the torque request for the engine when a single slip event is followed by a second slip event before a full engine torque request is restored.
Figure 5B:
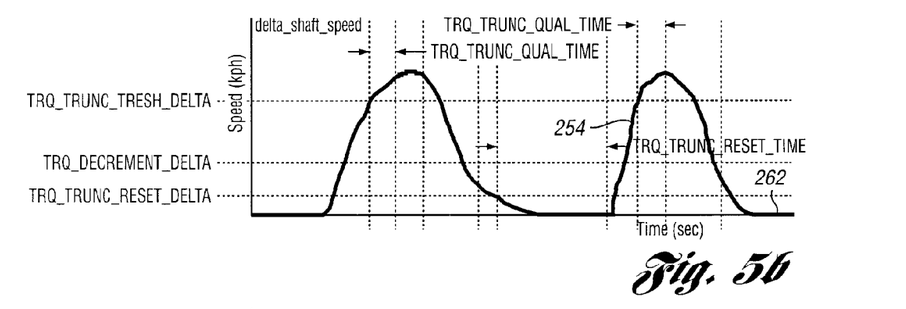
Figure 5C:
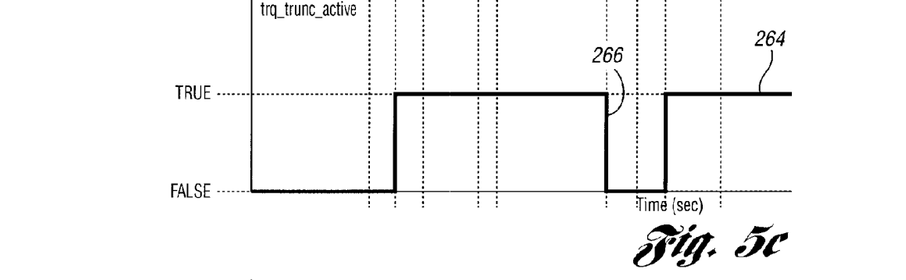
FIG. 5c is a plot indicating the period during the clutch slip condition when engine torque truncation occurs.
Figure 5D:
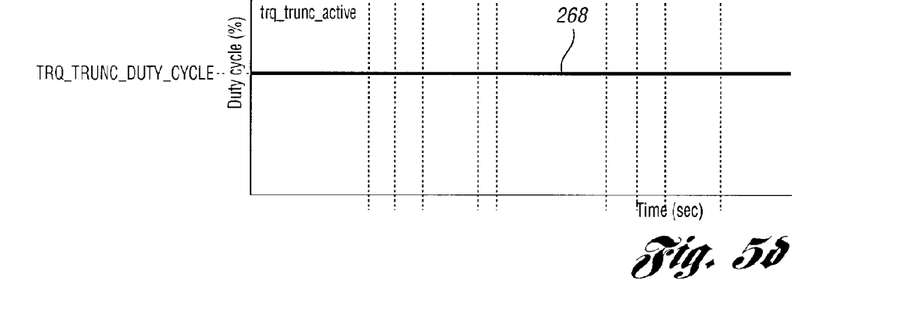

FIG. 5*a* demonstrates that during the ramp-up procedure, illustrated at 250 in FIG. 4*a*, a slip condition again is present, as indicated at 254 in FIG. 5*b*. As the torque request is increased to a value, shown at 258, the torque request again is stepped down, as shown at 260, until the clutch slip is eliminated, as shown at 262 in FIG. 5*b*. During this clutch slip reduction, the engine torque truncation again continues, as shown at 264 in FIG. 5*c*, following the short interruption of torque truncation at 266.

Figure 6C:
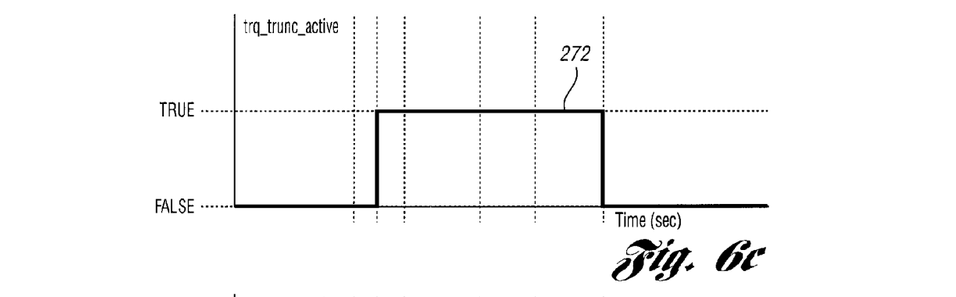
FIG. 6c is a time plot showing the period during which torque reduction of FIG. 6a occurs.
Figure 6D:
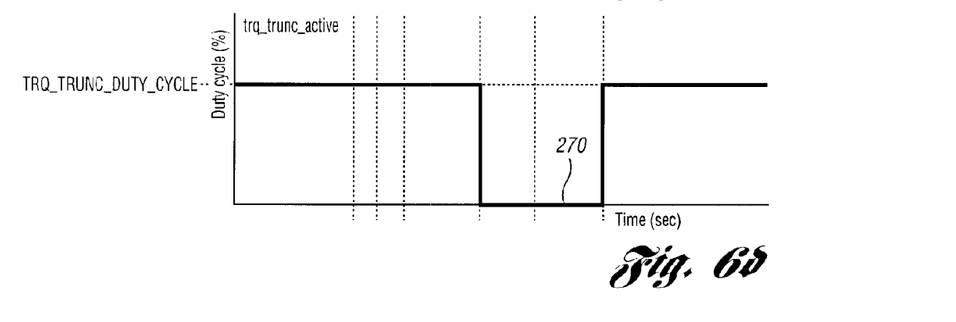
FIG. 6d shows the time plot for the clutch duty cycle and a time interval when the duty cycle is shut off as the torque request reaches its minimum value.

Unlike the duty cycle plot 190 of FIG. 4*d*, the duty cycle plot of FIG. 6*d* is interrupted since the transfer drive clutch is turned off until the clutch slip is eliminated, as shown at 270 in FIG. 6*d*, while engine torque truncation continues, as shown in FIG. 6*c* at 272.

Although an embodiment of the invention has been disclosed, it will be apparent to persons skilled in the art that modifications may be made without departing from the scope of the invention. All such modifications and equivalents thereof are intended to be included within the scope of the claims.

What is claimed is:

1. A method for regulating driving torque transfer through a friction clutch in a torque transfer case for a powertrain for a four-wheel drive vehicle; the powertrain including an engine, a geared transmission between the engine and the torque transfer case; an engine controller and a powertrain controller; a primary axle driveshaft connected driveably to torque output elements of the torque transfer case and a secondary axle driveshaft connected to torque output elements of the torque transfer case through the friction clutch; the method comprising:

engaging the friction clutch to effect power transfer from the engine to the secondary axle driveshaft as engine power is delivered to the primary axle driveshaft;

determining whether driving friction elements of the friction clutch are slipping; and     reducing engine torque request in incremental steps until slipping of the driving friction elements of the friction clutch is eliminated.

2. A method for regulating driving torque transfer through a friction clutch in a torque transfer case for a powertrain for a four-wheel drive vehicle; the powertrain including an engine, a geared transmission between the engine and the torque transfer case; an engine controller and a powertrain controller; a primary axle driveshaft connected driveably to torque output elements of the torque transfer case and a secondary axle driveshaft connected to torque output elements at the torque transfer case through the friction clutch; the method comprising:

engaging the friction clutch to effect power transfer from the engine to the secondary axle driveshaft as engine power is delivered to the primary axle driveshaft;

determining whether driving friction elements of the friction clutch are slipping; and reducing engine torque until slipping of the driving friction elements of the friction clutch is eliminated;

the step of reducing engine torque comprising requesting the engine controller to command an initial incremental engine torque reduction;

determining whether the driving friction elements are slipping following the incremental torque reduction;

operating the vehicle with reduced engine power when friction element slipping is eliminated; and requesting the engine controller to command an increased engine torque following the incremental torque reduction when friction element slipping is not present.

3. The method set forth in claim 2 wherein the incremental torque reduction is followed by the step of requesting the engine controller to command a further incremental engine torque reduction if slipping is present following the initial incremental engine torque reduction; and determining whether driving friction element slipping is present following the further incremental torque reduction.

4. The method set forth in claim 2 including the steps of monitoring the duration of friction element slipping following each incremental engine torque reduction and requesting the engine controller to command an engine torque reduction if slipping continues longer than a predetermined duration.

5. The method set forth in claim 3 including the steps of monitoring the duration of friction element slipping following each incremental engine torque reduction and requesting the engine controller to command an engine torque reduction if slipping continues longer than a predetermined duration.

6. The method set forth in claim 2 wherein the engine controller is requested to command an increased engine torque in successive increments after friction element slipping is eliminated; and monitoring friction element slipping following each successive command for increased torque, whereby the incremental commanded engine torque increases are continued until friction element slipping is detected.

7. The method set forth in claim 2 wherein the step of determining whether the driving friction elements are slipping comprises sensing the speed of the secondary axle driveshaft sensing the speed of the primary axle driveshaft and comparing the secondary axle driveshaft speed and the primary axle driveshaft speed.

8. The method set forth in claim 3 wherein the step of determining whether the driving friction elements are slipping comprises sensing the speed of the secondary axle driveshaft sensing the speed of the primary axle driveshaft and comparing the secondary axle driveshaft speed and the primary axle driveshaft speed.

9. The method set forth in claim 3 wherein the command for increased engine torque occurs in incremental steps below a threshold value above which friction element slipping would occur.

10. A method for regulating driving torque transfer through a friction clutch in a torque transfer case for a powertrain for a four-wheel drive vehicle; the powertrain including an engine, a geared transmission between the engine and the torque transfer case; an engine controller and a powertrain controller; a primary axle driveshaft connected driveably to torque output elements of the torque transfer case and a secondary axle driveshaft connected to torque output elements of the torque transfer case through the friction clutch; the method comprising:

engaging the friction clutch to effect power transfer from the engine to the secondary axle driveshaft as engine power is delivered to the primary axle driveshaft;

determining whether driving friction elements of the friction clutch are slipping; and reducing engine torque until slipping of the diving friction elements of the friction clutch is eliminated;

the step of determining whether the driving friction elements are slipping comprising sensing the speed of the secondary axle driveshaft, sensing the speed of the primary axle driveshaft and comparing the secondary axle driveshaft speed and the primary axle driveshaft speed.

* * * * *